Figure 1:
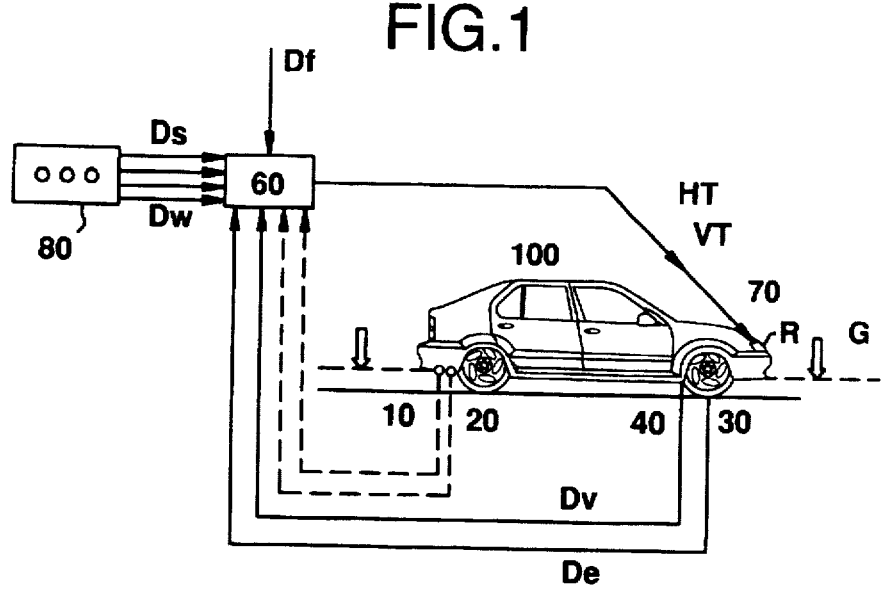

US005798911A

United States Patent [19]
Josić

[11] Patent Number: 5,798,911
[45] Date of Patent: Aug. 25, 1998

[54] AUTOMATIC LIGHT SYSTEM FOR MOTOR VEHICLES OF ALL KINDS AND A METHOD FOR CONTROLLING A LIGHT SYSTEM

[75] Inventor: Ante Josić, Vrhovac 12/A, loooo Zagreb, Croatia

[73] Assignee: Ante Josic, Croatia

[21] Appl. No.: 521,541

[22] Filed: Aug. 30, 1995

[30] Foreign Application Priority Data

Sep. 2, 1994 [DE] Germany .......................... 44 31 332.2

[51] Int. Cl.$^6$ .................................................. B60Q 1/06
[52] U.S. Cl. .............................. 362/66; 362/37; 362/61; 362/286
[58] Field of Search ...................... 362/66, 72, 61, 362/71, 40, 286, 287, 284, 80, 37, 277

[56] References Cited

U.S. PATENT DOCUMENTS

| | | |
|---|---|---|
| 3,179,845 | 4/1965 | Kulwiec . |
| 4,768,135 | 8/1988 | Kretschmer et al. .............. 362/66 |
| 4,868,720 | 9/1989 | Miyauchi et al. .............. 362/71 |
| 4,870,545 | 9/1989 | Hatanaka et al. .............. 362/72 |
| 4,891,559 | 1/1990 | Matsumoto et al. .............. 362/71 |
| 4,967,319 | 10/1990 | Seko .............. 362/80 |
| 5,191,530 | 3/1993 | Hussmann et al. .............. 362/71 |
| 5,217,087 | 6/1993 | Ikegami et al. .............. 362/72 |
| 5,426,571 | 6/1995 | Jones .............. 362/66 |

FOREIGN PATENT DOCUMENTS

| | | |
|---|---|---|
| 2.155.503 | 4/1973 | France . |
| A2357960 | 11/1973 | Germany . |
| A2437585 | 11/1975 | Germany . |
| A3110094 | 3/1981 | Germany . |
| A3545495 | 7/1987 | Germany . |
| A3834764 | 5/1989 | Germany . |
| 3810840 | 11/1989 | Germany . |
| 41 22 531 A 1 | 1/1993 | Germany . |
| A4225370 | 2/1994 | Germany . |
| 43 39 555 A 1 | 6/1994 | Germany . |
| 43 41 409 A 1 | 6/1995 | Germany . |

OTHER PUBLICATIONS

German Office action dated Mar. 20, 1995.

Primary Examiner—Thomas M. Sember
Attorney, Agent, or Firm—Murtha, Cullina, Richter & Pinney

[57] ABSTRACT

The invention relates to an automatic light system (ALS) for motor vehicles of all types. According to the invention the headlamp system is operated in such a manner that at every instant of the journey the minimum beam range does not drop below the instantaneous stopping distance (=braking distance+reaction distance) of the vehicle and the particular light intensity required is determined and set. This can be done for example by vertical pivoting of the headlamps or reflectors. Furthermore, the beam direction is adapted to the instantaneous steering angle.

10 Claims, 7 Drawing Sheets

AUTOMATIC LIGHT SYSTEM FOR MOTOR VEHICLES OF ALL KINDS AND A METHOD FOR CONTROLLING A LIGHT SYSTEM

The invention relates to an automatic light system (ALS) for motor vehicles of all kinds and to a method for controlling a light system.

In modern motor vehicle illumination or light systems there is a substantial deficit due to the fact that generally a distinction is made only between dipped beam and main beam and accordingly only these two light modes can be set in vehicles.

This has the following, in some cases dangerous, disadvantages:

that the eyes of the driver become tired with the constant dipping and switching back to main beam, that other vehicles influence the driver's perception by the operation of switching between dipped and main beams, that with the known vehicle light system road or terrain sections are illuminated partially too strongly or inadequately, that dazzling occurs from oncoming traffic, that adaptation to weather or road conditions is not possible, that the lighting stages are not adapted to the traffic and speed conditions, i.e. the dipped light is inadequate at medium speed whilst the illuminating range of the main beam is too great.

The above enumeration itself shows that the conventional lighting system for vehicles in no way satisfies present-day safety requirements. An initial suggestion for improving vehicle lighting is provided by DE-A-2357960. This publication proposes obviating the asymmetry of the headlamp beam when driving on fast roads by switching the usual asymmetrical dipped beam for fast driving such that the "asymmetrical component" being directed onto the centre of the road.

It is known from DE-A-2437585 to modify the position of the headlamps of a motor vehicle in dependence upon the speed, and in particular in poor weather or at high speed to switch on a longer-range lighting.

DE-A-3545495 also discloses a speed-dependent regulation of the beam range, the aim in particular being to reduce the dazzling effect of other road users.

Finally, attention is drawn to DE-A-3834764 which describes a headlamp device for motor bicycles in which in dependence upon the vehicle speed and the handlebar rotation angle the horizontal or vertical position of the headlamp reflectors is adjusted to ensure adequate illumination of the road in curves.

Admittedly, in these light systems the beam ranges or the lighting conditions are adjusted in dependence upon the speed; however, the inventor has recognised that this hardly or only inadequately improves driving safety. For he has recognised that the beam range and intensity which a vehicle absolutely needs at each moment of its travelling cannot be regulated solely with the speed.

In contrast, the invention is based on the problem of providing a light system or a method for controlling a light system for motoring vehicles of all types in which the driving safety is increased, the light control is adapted to the capability of the human eye and the road in front of the vehicle is illuminated reliably and in optimum manner.

A further problem resides in providing a light system in which the vehicle lighting is adapted to the road and weather conditions and the beam range and intensity at any moment of the journey corresponds to the safety requirements, even when the ambient conditions change.

A further problem resides in making available an emergency control for a light system.

These problems are solved by an automatic light system and by a method for controlling a light system.

With the novel scientific recognition, not recognised until this day, regarding the mutual fixed and inseparable relationship between the beam length and the stopping distance of the vehicle, the inventor has arrived directly at the discovery which he defines once and for all finally in precise manner as:

THE STOPPING DISTANCE OF A VEHICLE IS THE SOLE MEASURE WITH WHICH THE BEAM RANGE FOR THE VEHICLE CAN BE ASSESSED AND REGULATED AT ANY TIME OF ITS TRAVEL.

According to the invention, in an automatic light system for motor vehicles the headlamp means is controlled via an adjusting means in such a manner that during the journey the minimum beam range automatically does not drop below the stopping distance of the vehicle.

The inventor has arrived at the fundamental recognition that the minimum illumination range (or minimum beam length or range) which a vehicle must have at every time during its travel must not drop below the length of its stopping distance at that same moment.

This fundamental relationship established by the inventor may be expressed as a formula briefly as $$\text{minimum beam range} = \text{stopping distance}.$$

It is the inventor's wish that this formula be referred to as "Mario formula".

Together with the known relationship that the stopping distance is made up of the sum of braking distance and reaction distance, the Mario formula defines for the first time and universally for all types of motor vehicles the magnitude of the beam range (minimum beam range) which a vehicle must have at any instant during its travel, this formula being the sole necessary measure. The universality is substantiated by the fact that all vehicle-specific and driver-specific influences and the influences of the environment are taken into account.

The braking distance is made up of the speed, the type of vehicle, the weight, the type of tires, etc., the road condition (dry, wet, snow, ice).

According to the invention, for all road conditions the braking distance is to be based on the fully laden vehicle with a normal braking (i.e. the respective longest braking distance; corresponding measurements can be carried out in simple manner by the vehicle manufacturers or other experts).

The reaction travel is the distance which a vehicle covers between the appearance of an obstruction and the reaction of the driver to the obstruction at the instantaneous speed. It thus depends on the reaction time of the driver, which itself depends on whether the driver is an inexperienced driver or a professional driver, additionally depending on the modified perception of the driver due to the particular visual conditions. For example, the reaction time for inexperienced drivers on a dry road in good weather is between 1.0 and 1.7 sec.

For safety reasons, a time of 1.0 sec (for inexperienced drivers) is therefore defined according to the invention as minimum reaction time on a dry road with good visability.

This gives minimum beam range=stopping distance for a reaction time of 1 sec.

maximum beam range=stopping distance for a reaction time of 1.7 sec.

The maximum beam range (maximum illumination distance) indicates the beam distance or range which is required by the driver as a maximum at any instant of travel on dry roads with good visibility.

Corresponding considerations apply accordingly to the respective different reaction times for other road/visibility conditions.

For professional drivers, a minimum reaction time (dry road, good visibility) of about 0.4 sec is defined. The maximum reaction time for professional drivers is so defined that it is in the same ratio to the minimum reaction time of the professional driver as is the maximum reaction time to the minimum reaction time for an inexperienced driver. Corresponding relationships apply to other road/visibility conditions.

This means that the particular vehicle beam range actually set always lies between the two extreme values and is defined by vehicle beam length=minimum beam range+R, R depending on the reaction times.

The actual beam range (beam length) can thus also be set above the minimum beam range, in particular to a value between minimum beam range and maximum beam range as defined above.

The relationships set forth above define the fundamental outline conditions for determining the beam ranges of an automatic light system (ALS), and the person skilled in the art is thereby able by simple measurements to determine the exact numerical values for the various braking distances in dependence upon the vehicle data and the road conditions and for the reaction times in dependence upon the type of driver and visibility conditions.

In addition to the linking of minimum beam range and stopping distance, according to the invention the beam range and the beam intensity are to form a unit. For the inventor has recognised that for each of the above visibility situations a separate specific light intensity is necessary and accordingly the light intensity is adapted to the weather conditions, i.e. increased under poor visibility and reduced under better visibility. Also, the light intensity is to be adapted to the beam range so that with a short beam range no "overillumination" occurs and with a long beam range no "underillumination". Accordingly, when the beam range increases the light intensity is increased and when the beam range is reduced the light intensity is correspondingly reduced so that the light intensities in the illuminated area remain substantially constant.

Together with the Mario formula this gives a guarantee that at any instant of their journey all vehicles have a beam range and intensity which is always adapted to the stopping distance and takes account of the visibility conditions.

It is further achieved that on journeys in which the lighting is necessary the vehicle driver is always informed of the distance in which he is able to stop. In other words, firstly for his journey the beam range made available is always adequate and secondly he is given an automatic indication of the distance within which he can stop. Accordingly, the automatic light system according to the invention fulfils two purposes, i.e. firstly the illumination of a (sufficient) distance and secondly the indication of the stopping distance.

Preferably, in a headlamp means according to the invention the reflectors are made pivotal, that is horizontally and/or vertically, so that by the alignment of the reflectors onto the road the illuminated area can follow curves at the same time and furthermore the beam range is adapted to the driving conditions. Alternatively, it is possible to make the entire headlamp, that is with reflector and bulbs, pivotal or also only to move the bulb accordingly. Combinations of the possibilities referred to above can also be implemented.

According to the invention the beam range is adjusted completely automatically, as is the setting of the beam direction (horizontal deflection). The horizontal adjustment is always synchronised with the position of the steering wheel, either via the adjusting means or by a direct connection to the steering wheel.

According to the invention the adjustments for the horizontal position and the vertical position take place independently of each other and completely separately.

Fundamentally, the adjustment of the beam range and/or the beam direction should take place continuously; it is however also possible to adapt these parameters in steps, i.e. provide discrete values in suitable gradations.

The inclination of an angle of a vehicle changes for example with the loading of the vehicle. If for example the boot is arranged at the rear of the vehicle the inclination angle increases with increasing loading of the vehicle. This applies correspondingly to different load states of the vehicle.

To determine the inclination angle of the vehicle an inclination angle pickup is preferably provided on the vehicle. Preferably, said pickup determines not only the inclination angle of the vehicle with respect to the ground horizontal but the inclination angle with respect to the road surface. This is for example important when a vehicle is parked on a slope or the like. On the basis of the measurements of the inclination angle pickup the beam range can be corrected, firstly before starting the journey (load state) and secondly during the journey, for example on sudden braking or acceleration manoeuvres.

According to a further development of the invention a combination of main reflectors and fog reflectors or headlamps and foglamps may be provided which are controllable independently of each other, the fog reflectors being adapted to the particular requirements under poor visibility conditions. This leads to an unusual variety of adjustment possibilities and also to optimum adaptation of the lighting conditions to the road and weather conditions. According to the invention, at the start of the journey the reflectors or headlamps are set to an initial position which represents a minimum position below which other positions will normally not fall. The minimum position is defined for example in that it covers a beam range of up to 30 meters, which as a rule is sufficient for journeys within built-up areas, i.e. for speeds of about 50 km/h on a dry road with good visibility. Under different road/visibility conditions this distance of 30 m represents a correspondingly different speed.

Since the beam range depends not only on the vehicle-specific data (mounting height of the headlamps, illumination characteristics of the headlamps) but also on the load state, the minimum position is determined in dependence upon the signal of the inclination angle sensor.

With the light system according to the invention and the method for controlling a light system according to the invention, in addition the stresses on the senses of the vehicle driver are reduced and minimised because the beam range is automatically and continuously varied and thus no sudden illumination differences occur during the journey.

Since the beam range is automatically set to the necessary value, dazzling, for example with oncoming traffic or driving in a queue, is largely avoided, in particular when the maximum beam range defined above is not exceeded.

Furthermore, according to the invention it is possible for the vehicle driver to adjust the beam range between the value predefined by the stopping distance and the value predefined by the initial position defined above (minimum range). Preferably, the reduction of the beam range towards the initial position takes place at a minimum rate, i.e. when initiated by the vehicle driver the beam range is gradually reduced to a desired value. In contrast, the beam range is increased from a set value to the necessary value in as short a time as possible. Firstly, this subjects the eyes of the vehicle driver to relatively little stress (during the reduction) and secondly provides the necessary safety in that the minimum beam range (the necessary beam range) can be reset very rapidly.

In addition, a special emergency control is provided according to the invention. The emergency control relates to the case of full braking due to an obstruction on the road. In this case the beam range is reduced from the instant at which the brake pedal is actuated onwards, down to the actual braking distance. This means that when the vehicle driver actuates the brake pedal to effect a full braking the adjusting means reduces the beam range to the braking distance. Admittedly, this reduces the beam range, by the reaction distance; this is however of no consequence because at the instant under consideration the brakes have already been actuated and consequently the stopping travel is reduced to the braking travel. This has the advantage that possible obstructions such as pedestrians, animals or the like, are not dazzled by the vehicle. This is in contrast to known light control systems in which the beam range is increased in an emergency (DE-A-3545459). It is however important to avoid dazzling pedestrians or dazzling wild animals; at the same time, after actuation of the brake pedal an indication is given to the driver within which distance he can stop.

Figure 2A:
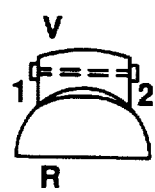
Figure 2B:
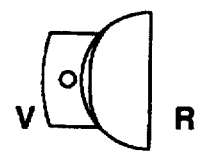
Figure 13:
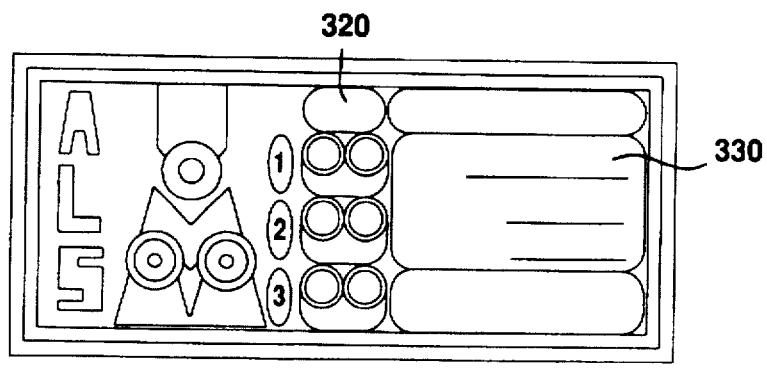
Figure 3A:
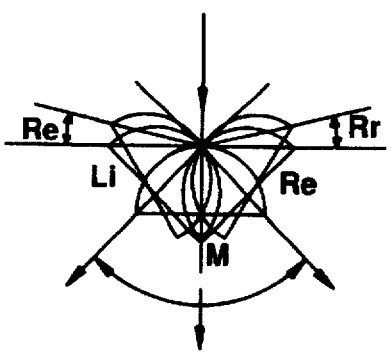
Figure 3B:
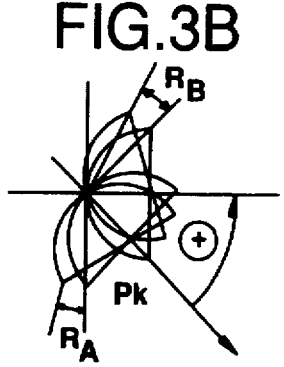
Figure 3C:
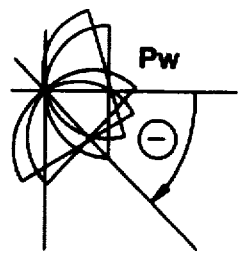
Figure 3D:
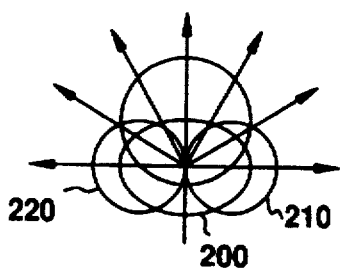
Figure 3E:
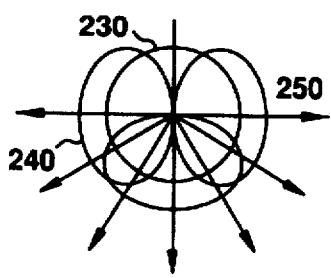
Figure 4:
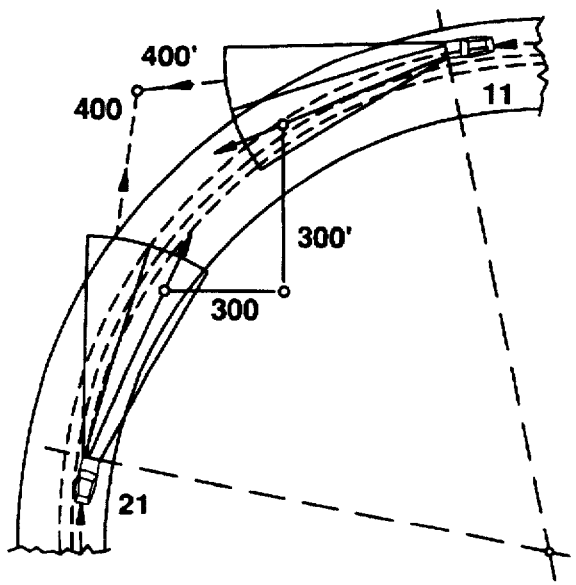
Figure 5:
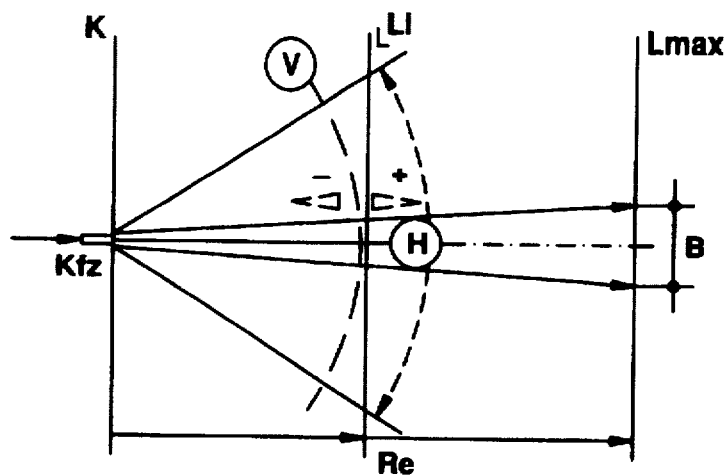
Figure 6:
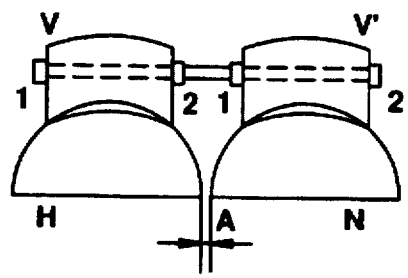
Figure 7:
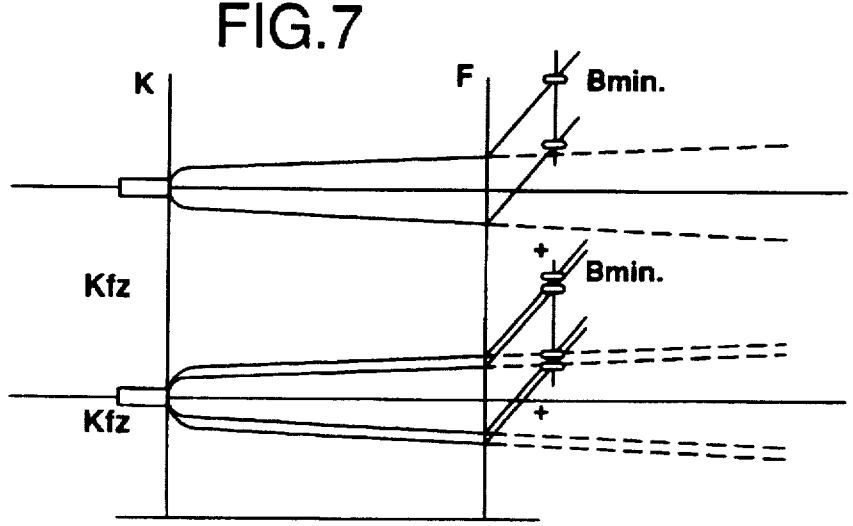
Figure 8:
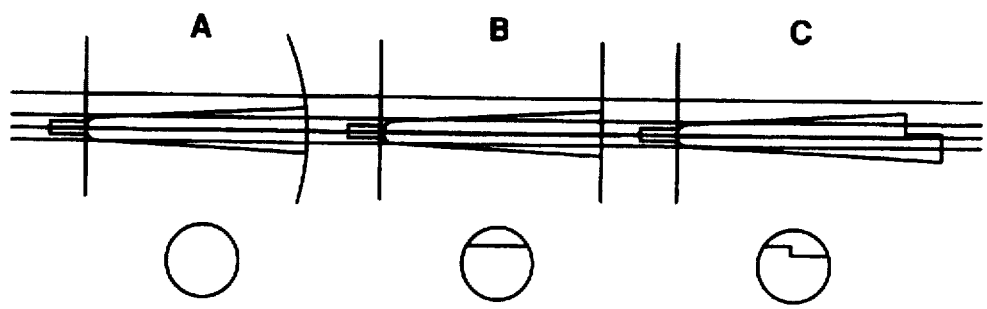
Figure 9A:
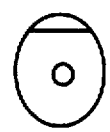
Figure 9B:
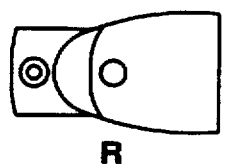
Figure 10:
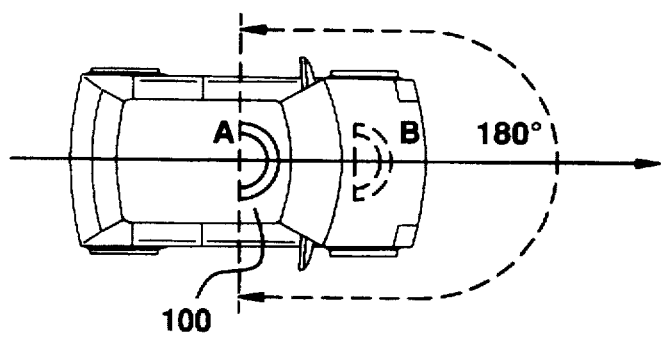
Figure 11:
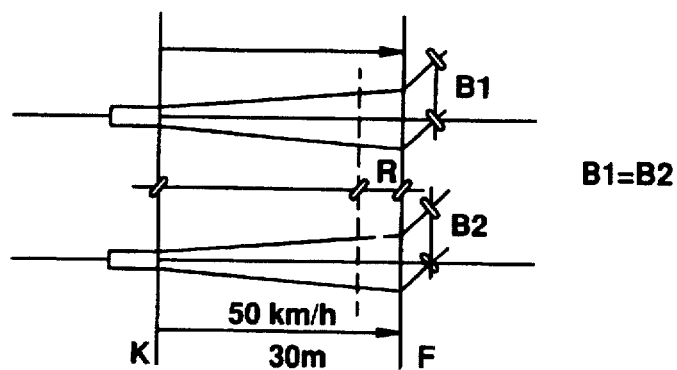
Figure 12:
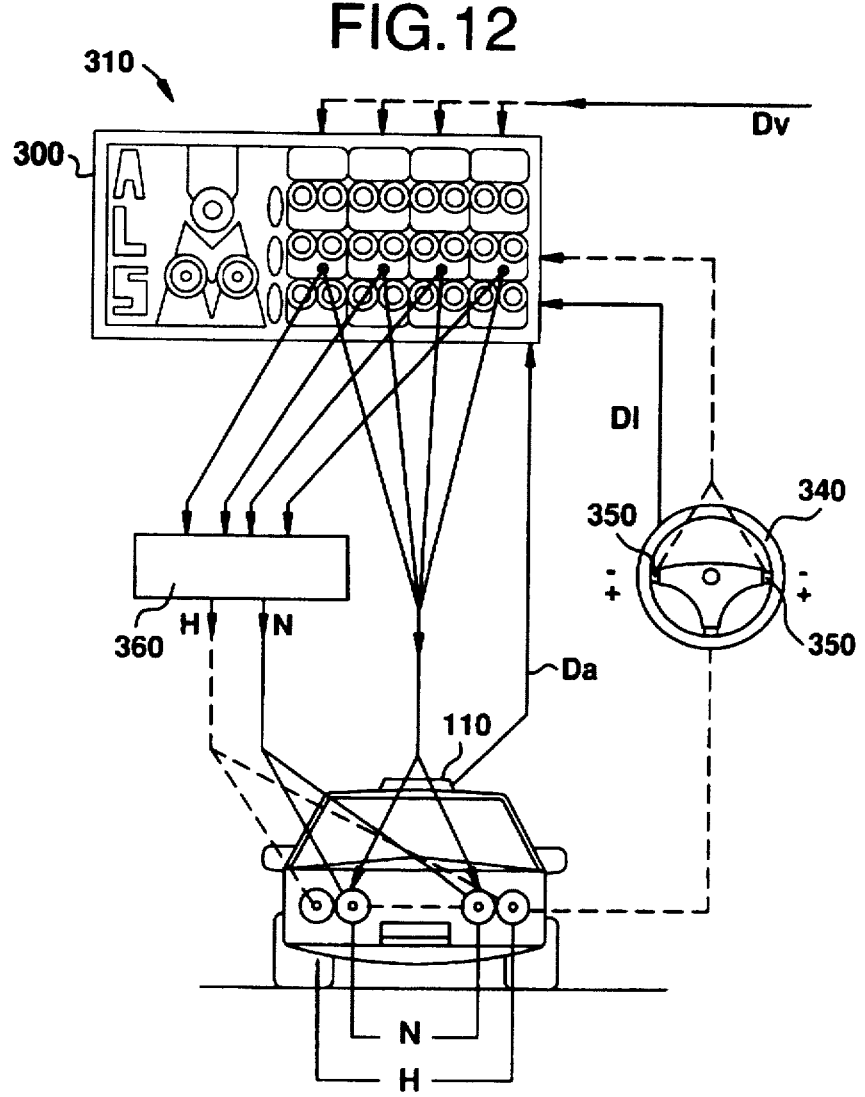
Figure 14:
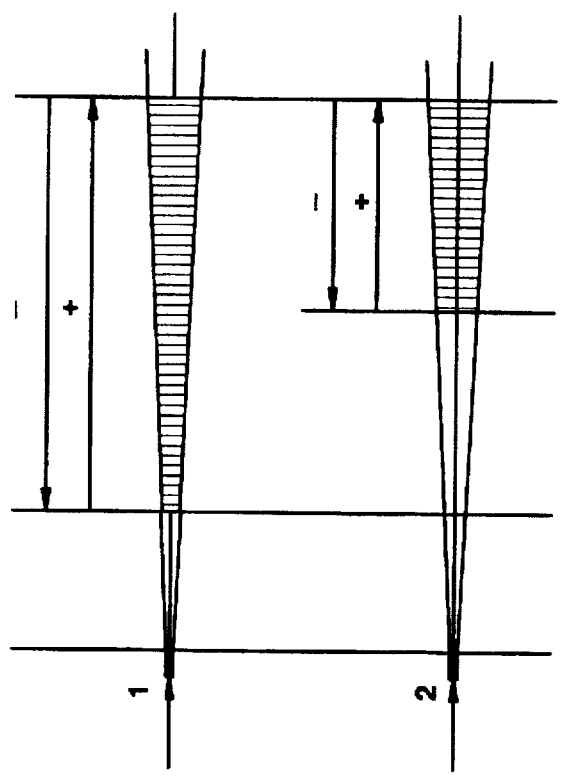
Figure 15:
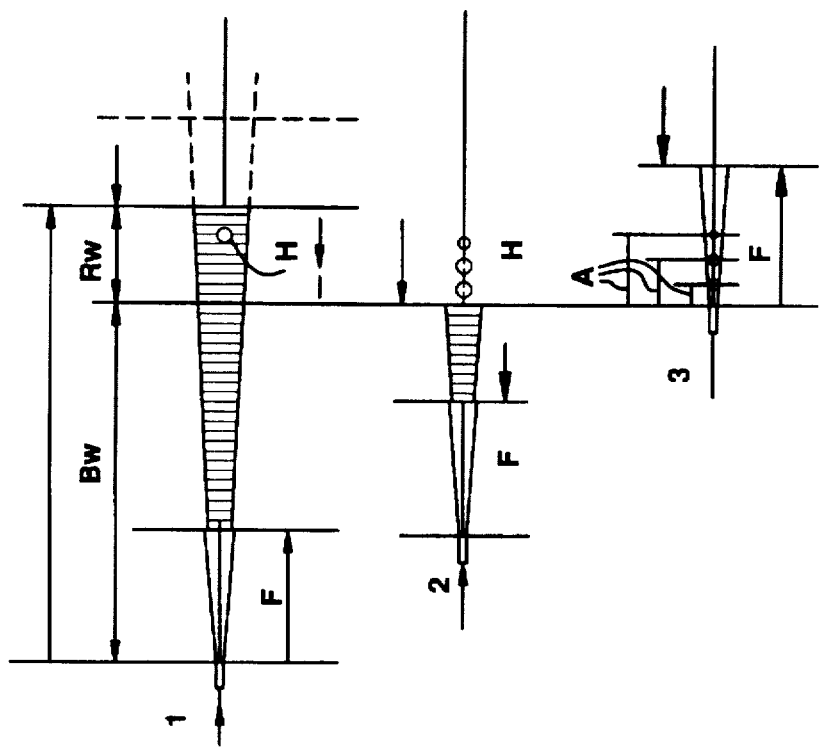
Figure 16:
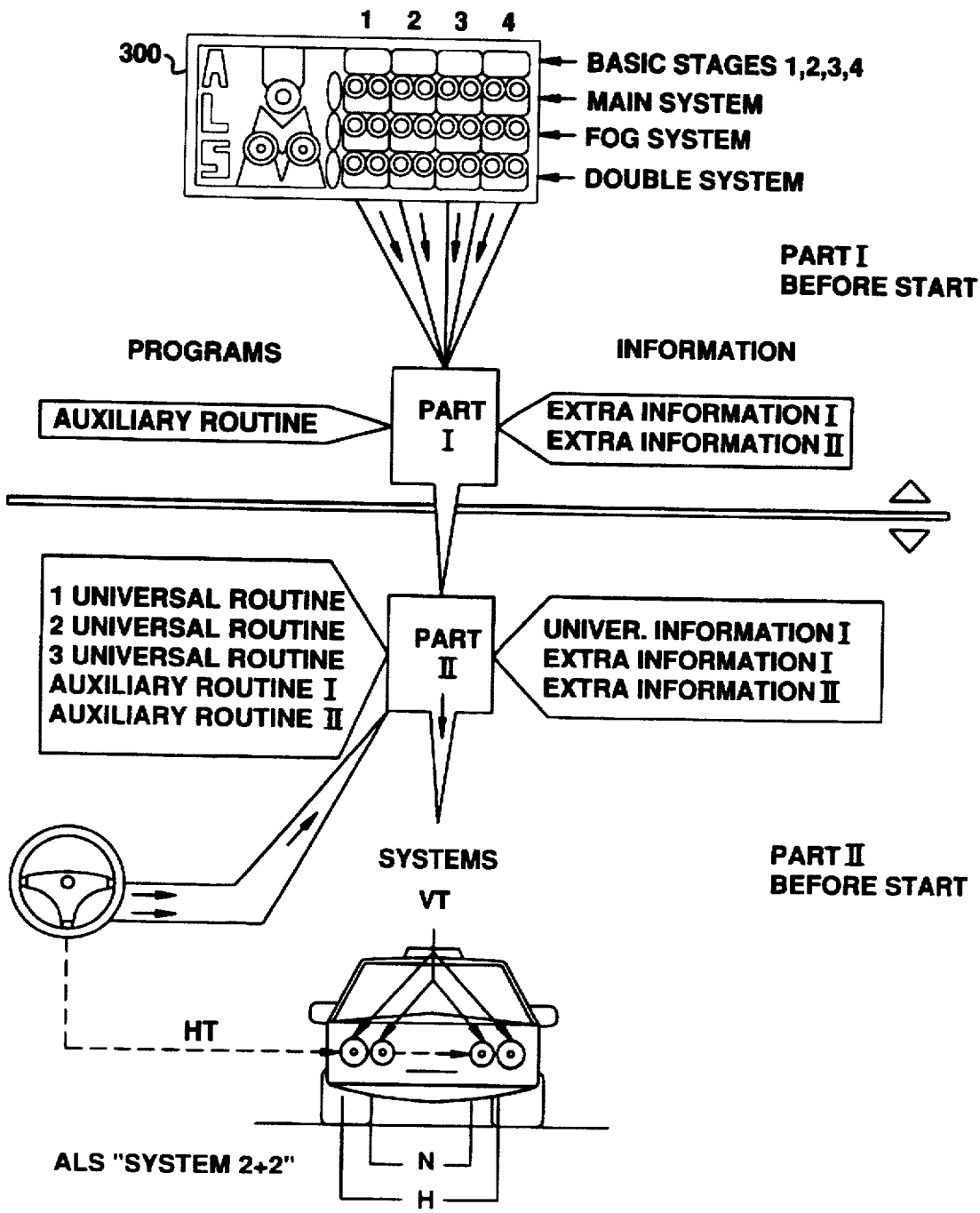

Examples of the embodiment of the invention will be explained with the aid of the attached drawings, wherein FIG. 1 shows a schematic illustration of a motor vehicle with the automatic light system according to the invention, FIG. 2 is a plan view and side elevation of a reflector or lamp, FIG. 3 is an illustration of the illumination characteristics in extreme positions of the reflectors, FIG. 4 explains the horizontal dipping technique according to the invention, FIG. 5 is a schematic illustration to explain the beam range and direction, FIG. 6 shows an arrangement having two reflectors, FIG. 7 is a schematic illustration to explain the beam width, FIG. 8 is an illustration to explain various light and reflector forms, FIG. 9 shows a further reflector form, FIG. 10 is a schematic illustration of a further reflector form, FIG. 11 is an illustration of the illumination form, FIG. 12 is a schematic illustration of the entire system, FIG. 13 shows a variant of the operating panel, FIG. 14 is a schematic illustration to explain a universal program during the journey, FIG. 15 is an illustration to explain an emergency program during the journey and FIG. 16 is a schematic illustration of the entire system.

In the description of the invention the term "beam range" denotes the maximum distance which is illuminated by the headlamp system, i.e. the end point of the illuminated area.

FIG. 1 shows schematically a motor vehicle, in particular a private motor car 100. In addition to the usual operating and equipment elements, such as a headlamp system 70, steering, gearshift, engine, etc., the vehicle 100 also has an input means 80, an adjusting or control means (multicomputer) 60 for the headlamp unit 70, a vibration sensor 10 and an inclination angle pickup 20. The control means 60 serves to control or regulate the beam range of the headlamp unit 70 and is connected to the input means 80, the vibration sensor 10, the inclination angle pickup 20 and the headlamp unit 70.

The control means 60 continuously receives speed data Dv from a speed sensor 40 (i.e. via a rotary speed sensor, -the tachometer, the drive unit, a separate measuring device or the like). Data Dl indicating the actual steering angle are sent to the control means via a steering angle pickup 30 which can be mounted on the steering linkage itself or on a suitable component, for example a wheel. From fixed preset data Df concerning the vehicle characteristics, such as type and tires, on which-the braking travel is dependent, together with data Ds on the road conditions and Dw on the weather conditions, which are entered via the input means 80 by the driver, the control means 60 determines in dependence upon the information Dv from the sensor 40 the optimum value for the setting of the reflectors and/or the lamps 70 of the headlamp unit.

In particular, via the signal Dl of the steering angle pickup 30 the "horizontal position" of the headlamps is set in dependence upon the steering angle.

The inclination angle pickup 20 serves to determine the inclination angle of the vehicle longitudinal axis (horizontal axis) to the road in order to be able to make the initial setting of the headlamp unit 70, as will be described hereinafter.

The inclination angle pickup should not determine the inclination angle to the vertical, since when the vehicle is parked on a slope this would give an incorrect value, but the inclination of the horizontal axis of the motor vehicle to the road.

Apart from the values of the aforementioned sensors, further parameters are decisive, in particular the braking distance of the vehicle depending upon the weight, the road conditions, the equipment of the vehicle, etc.

As illustrated already in FIG. 1, the adjusting means 60 acts on the reflectors. An example of a reflector is illustrated in FIG. 2. FIG. 2 shows on the left side a plan view of the reflector R which is pivotally mounted in the vertical direction about an axis 1-2. The right side of FIG. 2 shows the reflector R in side elevation. Fundamentally, the reflector has a conventional configuration but is provided with a drive V for pivoting in the vertical direction. The lighting system preferably consists of at least two reflectors which are arranged on the right and left side of the vehicle; in a motor cycle only one corresponding reflector is provided.

Of course, the reflector drive V may be mechanical, fluid-operated, i.e. pneumatic, hydraulic or electrohydraulic, or may be electrically operated, the mechanical variant being however less advisable. The horizontal drive is not shown but can be configured accordingly. The horizontal drive is connected to the steering wheel, directly or via the steering angle pickup 30, and is consequently completely synchronised with the steering wheel movement.

FIG. 3 shows schematically the adjusting possibilities for a single reflector or lamp.

A is a plan view of a reflector and shows the horizontal setting positions of the reflector, a centre position Mi (in which it is directed along the vehicle longitudinal axis), a maximum right position Re and a maximum left position Li which can be assumed by the headlamp or the reflector R in dependence upon the angle lock of the steering wheel. Via the drive V the reflector can be pivoted in infinitely variable manner between the two extreme positions Re and Li depending upon the control by the control means. This adjustment is referred to hereinafter as "horizontal technique".

Safety margins Rr and Rl (positions shown in black) are provided to ensure sufficient adjusting range even in all extreme positions.

B and C are side elevations of the reflector and show the reflector R in a maximum downwardly inclined position Pk in which a minimum beam range is achieved, and in an upright position Pw in which a maximum beam range is achieved. Safety margins Rb and Ra are likewise provided for necessary manual adjustments. Here as well the control of the position of the reflectors is effected in infinitely variable manner by the control means 60 between the two maximum positions. These adjustments are referred to hereinafter accordingly as "vertical technique".

It should be emphasised here that basically the vertical technique and the horizontal technique are independent of each other, i.e. the vertical and horizontal adjustments take place separately of each other.

The illustrations D and E are schematical illustrations of front views of the reflector in various adjustment positions. The curves denoted by reference numerals result from the following combinations:

Re with Pk: Circle 210

Li with Pk: Circle 220

M with Pk: Ellipse 200

M with Pw: Circle 230

Li with Pw: Ellipse 240

Re with Pw: Ellipse 250

In conventional technique in which the horizontal positions of the reflectors are not adjustable, the road is not illuminated in optimum manner in curves. This is made clear by the illustration of FIG. 4. The illumination cone 400 of a vehicle 21 is directed on to the oncoming lane and can therefore dazzle oncoming traffic. The illumination cone 400' of the vehicle 11 illuminates the area lying adjacent the road. In contrast, by employing the horizontal technique the illumination cone is varied in accordance with the steering angle and consequently according to the invention the illumination cones 300, 300' result for the vehicles and the road is illuminated in optimum manner without dazzling oncoming traffic.

The system described so far operates as follows:

Before starting his journey via the input or operating unit 80 the driver introduces data into the system, that is a) on the road conditions (dry, wet, snow, ice), b) on the visibility conditions (I: good, II: average as in rain or mist, III: poor as in fog or heavy snowfall).

This information is stored as data Ds and Dw in the control unit. On the basis of the signals of the vibration sensor 10 the control means determines in an auxiliary routine I whether the (stationary) vehicle has come to rest (the passengers have taken their seats and the load is in place). If this is the case the control means determines in the auxiliary routine I the inclination angle of the vehicle to the road and adjusts an initial position (that is a predetermined minimum beam range) for the vertical technique. This completes the initialisation of the automatic light system in the auxiliary routine I.

During the journey, from the fixed data Df on the vehicle, the entered data Ds, Dw on the road and visibility conditions and the data Dv of the speed sensor, the control means continuously determines in a universal routine I the momentarily necessary minimum beam range in accordance with the stopping travel and sets this range via the vertical technique proceeding from the initial position or from the last existing position. Correspondingly, on the basis of the data Dl of the steering angle pickup 30 the beam direction is set via the horizontal technique.

These operations are illustrated in FIG. 5. During the journey, via the vertical technique (V) the minimum beam range L is continuously and infinitely variably increased (arrow+) or reduced (arrow−) in accordance with the instantaneous speed, and with the horizontal technique (H) the beam direction is adjusted in accordance with the steering angle between the two maximum positions Re and Li.

During the execution of the universal routine I, the inclination angle is continuously monitored in accordance with the auxiliary routine I. If the auxiliary routine detects a change of the inclination angle, i.e. on sudden braking or acceleration, the auxiliary routine adjusts the position of the reflectors in accordance with the modified inclination angle.

Although it is assumed in the above illustration that the settings can be made in infinitely variable manner, it is of course possible to conduct the settings in smaller steps provided that the steps satisfy the requirements regarding minimum beam range and beam direction; such discrete settings are to be covered by the term "infinitely variable".

To permit optimum adaptation of the illumination to the weather conditions, preferably a light system having two lamps or reflectors per vehicle a side is employed (system 2+2).

FIG. 6 shows a plan view of a combined headlamp with a main reflector H (or lamp) and a fog reflector N (or lamp). The two reflectors are arranged on horizontal vertical pivot axes 1-2, 1'-2' and are adjusted independently of each other as regards the beam range. Between the reflectors H and N a clearance A is provided so that the reflectors cannot strike against each other.

It is of course also possible to arrange the lamps (or reflectors) in a different manner, for example vertically one beneath the other. The observations made on the individual reflector apply accordingly to the adjustment of the beam range and beam direction and consequently further description is not necessary.

The main and fog reflectors are used in accordance with the previously mentioned visibility conditions; in stage I (good visibility) only the main reflectors are used. In stage II (average visibility) the main reflectors are activated but are left in their initial position and only the fog reflectors are operated in vertical technique. In stage III (poor visibility) both the main reflectors and the fog reflectors are operated in the manner according to the invention.

FIG. 7 schematically shows variation of the beam width. The beam width of fixed part 1 of the vehicle light (line F=30 m) is narrowed to a minimum, which is possible due to the horizontal movement; the beam width is adapted, with a fixed reflector angle, to the road category and with respect to road security, in particular to a necessary width Bmin and occasionally a supplement (+).

By the form of the reflectors and the vertical technique, it is achieved that the end line of the vehicle beam range can be configured in any desired form. For example, FIG. 8 shows the dependence of the form of this end line on the reflector form for three different cases: A rounded, B straight, C stepped (asymmetric). In particular in the case of asymmetry it must be ensured that only the vehicle's own lane is illuminated because otherwise dazzling could occur due to the vertical adjustment.

Preferably, according to the invention reflectors in elongated form are used which considerably improve the illumination of the area in front of the vehicle; such a reflector is shown for example in FIG. 9.

According to a further development the automatic light system is additionally provided with a light sensor. The light sensor is arranged externally on the vehicle and measures the average external light intensity independently of instantaneous dazzling, shade, and the like, and passes the corresponding signals to the control means 60. The control means analyses the signals for various purposes:

when the external light intensity exceeds a predetermined value the driver is informed that the lights are to be switched on, in dependence upon the external light intensity (change day-night) the light intensity of the vehicle lighting is regulated, i.e. with decreasing external light intensity is made more intense or vice versa. This may be done in steps or, in a further development, in continuous manner so that lighting intensity adapted to the external light intensity is automatically set.

FIG. 10 shows schematically a vehicle equipped with a light sensor 110, the light sensor being arranged in two different positions A, B. The light sensor is so constructed that it is substantially sensitive only to a light incidence of 180° from the travelling direction and is protected from light incidence from following vehicles. The mounting shown in FIG. 10 on the roof of the vehicle (position A) is to be preferred to the position B in the front region of the vehicle.

Admittedly, in the ideal case the minimum beam range is strictly dependent on the instaneous stopping distance.

However, for practical reasons it has been found expedient to proceed as described below.

At a speed of about 50 km/h for nearly all vehicles the minimum beam range is about 30 m. This beam range is fixedly set as the predefined minimum beam range Mi in the initial position (initialisation) and retained (PART 1) until a greater necessary minimum beam range results from the stopping distance determined (PART 2). FIG. 11 illustrates this situation with the aid of two different light forms adapted in optimum manner to the formula "vehicle beam length=minimum beam length+R". With a stationary vehicle (initialisation) and up to a speed of about 50 km/h the vehicle has a fixed beam range up to the line F; at a higher speed the beam range is variable and accordingly goes beyond said line. The control is thus divided into two sections, i.e. a first section in which the beam range is kept constant and a second section in which the beam range is adjusted to the stopping distance.

FIG. 12 shows schematically the configuration of the entire system with the components described above. The core of the system is a multicomputer 300 in which the input or operating unit 80 and the control means 60 are combined and which receives the data Dv, Dl and Da as described above. Fixedly stored, for example in a ROM, the multicomputer contains the vehicle-specific data for calculating the braking distance. Via a keyboard 310 the road and visibility-specific data Ds and Dw are entered. As already mentioned, the road conditions are divided into four possible categories, i.e. dry, wet, covered with snow and covered with ice. On the operating panel a separate column is assigned to each of these conditions. The rows of the operating panel are assigned to the different visibility conditions, that is good I, average II and poor III, so that twelve different combinations result for determining the stopping distance which all differ from each other and lead to completely different demands on the minimum beam range and intensity.

In particular, the individual basic stages will be set forth here:

Basic stage DRY the stage I (best visibility) corresponds to a dry road and good weather, the stage II (average visibility) corresponds to a dry road and mist, slight fog, or the like, the stage III corresponds to a dry road and medium fog or the like (this being only brief because the fog leads relatively rapidly to a wet road).

Basic stage RAIN

I: wet road in fine weather, light rain or slight fog (mist),

II: wet road with medium rain or medium fog,

III: wet road with heavy rain or dense fog.

Basic stage SNOW

I: snow on the road and fine weather, light snowfall or slight fog,

II: snow on the road and medium snowfall or medium fog,

III: snow on the road and heavy snowfall or dense fog.

Basic stage ICE

I: ice on the road and good weather, slight rain, fog or snowfall,

II: ice on the road and medium rain, snowfall or fog,

III: ice on the road and heavy rain, snowfall or dense fog.

For all these total of twelve stages the respective braking distances and reaction times or distances and the necessary illumination intensities are determined and preset in the input unit so that on selection of one of the twelve basic stages the corresponding values can be called up and on the basis thereof the beam ranges and intensities can be adapted in optimum manner.

After the driver has selected the suitable one of the twelve stages and if necessary selected the driver category (inexperienced, professional driver), the multicomputer determines the stopping travel for each instantaneous speed and further determines which reflectors are to be used (only H controlled, H fixed or only N controlled or H+N controlled), the vertical position of the reflectors used, the horizontal position of the reflectors used, the light intensity necessary with the instantaneous vertical position and according to the light signals of the light sensor 110, and passes corresponding control signals to the individual horizontal and vertical drives and via a light intensity regulator 360 to the supply system for the headlamps.

In this manner, at any instant the vehicle always has the necessary beam range and luminous intensity and always offers the road users optimum safety.

Of course, it is possible to calculate the beam range; it has been found expedient to determine the values of the respective beam ranges in advance and associate them with corresponding speeds in a "Table". For each of the twelve stages a separate Table is then compiled in advance and during the journey the beam range belonging to the speed travel is called up.

In a further development a sensor means is provided on the vehicle which automatically determines whether the road is dry, wet, covered with snow or icey. The operating panel may then be simplified as shown in FIG. 13. Via a display 320 the driver is informed of the road condition by a symbol or writing and he needs only further enter the information on the visibility conditions. Furthermore, an exchangeable module 330 is provided in which the vehicle-specific data are stored and called up by the multicomputer. If changes are made to the vehicle (for example the tires) it is only necessary to modify or exchange the module; the same applies when the automatic light system is installed in a different vehicle. For checking, the most important vehicle data are indicated visible to the driver on the outside of the module.

According to a preferred embodiment the control system continuously regulates the beam range to about the stopping distance and because of the control of the light intensity and width the dazzling of other road users is not actually possible; it is however expedient to provide the possibility of temporarily reducing the beam range area, for example with oncoming traffic. For this purpose, according to the invention a universal routine II is provided which is initiated via operating elements 350, for example keys on the steering wheel 340 (FIG. 12). After actuating one of the operating elements, in accordance with FIG. 15 the control means reduces (−) the beam range continuously down to the aforementioned minimum value M so that any possible dazzling of oncoming traffic is avoided. If it is not necessary to reduce the beam range to the minimum value Mi, for example because the oncoming vehicle has meanwhile passed, by renewed actuating of the operating element the prescribed operation is reversed and the control means increases (+) the beam range again to the value of the stopping distance. The sequence of the universal routine II is thereby completed.

For safety reasons, the control should be such that the beam range is reduced at as slow as possible a rate and increased at as fast as possible a rate. In this manner, on an average the illuminated area is kept as large as possible even on reducing the beam range.

In FIG. 15 the conditions for an emergency are shown, i.e. a full braking. In particular, the stopping distance is divided schematically into the braking distance Bw and the reaction distance Rw (illustration 1). In the case of an emergency braking because for example an obstruction H suddenly appears, an emergency signal is emitted which initiates the sequence of the universal routine III in which the control means automatically reduces the beam range to the instantaneously still required braking distance length (illustration 2) until the initial value of the beam range is reached and the vehicle is stationary (illustration 3). As a result, for example, people or wild animals are not unnecessarily dazzled. This is in contrast to known systems which in an emergency increase the illumination intensity, additionally dazzling wild animals or persons on the road, this being eliminated with the suggestion according to the invention. In addition, the operating person is given, at least during the start of the braking operation, information on the braking distance then still remaining.

The emergency control (universal routine III) operates whenever a full braking is performed. Consequently, the emergency signal may be generated for example by a means monitoring the braking system (pedal, brake line), or by an acceleration sensor; it is also possible to generate the emergency signal in the control means itself by converting the speed signal by differentiating to an acceleration value and comparing this value with a predetermined value corresponding to a full braking.

Apart from the preferred first variant of the universal routine III for the emergency explained above, other variants are also possible. In the second variant in the event of an emergency braking the beam range is not changed; it thus remains constant at the value of the stopping distance just before the brakes were actuated. Consequently, during the braking operation a very extensive area is illuminated, this giving on the one hand a better view but on the other involving the disadvantages of dazzling other persons or animals as described above.

The third variant resides in that the beam range in the event of an emergency braking is kept fixed with respect to the road, i.e. the beam range is so controlled that the most distant point still illuminated is fixed and the beam range can then be correspondingly reduced as the vehicle approaches this point until the minimum beam range is reached. With this procedure other road users or animals are not dazzled as much as with the second variant and consequently this variant is to be preferred to the second variant.

It must however be emphasised that the emergency control illustrated at the beginning in which in the event of an emergency braking the beam range is adjusted to the braking distance appears to be the most expedient possibility to the inventor because the resulting beam range in this case is sufficient for every aspect and least impairs other road users.

Summarising, it may be concluded that with the system according to the invention the driver is permanently and continuously provided with an indication of the distance within which he can stop. This provides a considerable safety advantage; such a possibility is not provided by any of the known lighting systems.

Since during the journey changes in visibility and/or road conditions may occur, according to the invention an auxiliary routine II is provided which implements a switching between the twelve stages of the ALS. For example, it may occur during the journey that the basic stage (according to FIG. 12) must be changed, for example on a change from "visibility good, I" to "average II". For this case, at the operating panel a switch must be made from lighting with only the headlamps and lighting with the foglamps, and this is done with said auxiliary routine II. After the switching-over referred to, the fog reflectors are switched on and set to the value predefined by the stopping distance. Correspondingly, the headlamps are set to the initial value Mi and thereafter switched off. These operations may take place simultaneously or consecutively.

The control operations running in the automatic light system according to the invention will be again briefly illustrated below in their context:

At the start of the journey an initial control (auxiliary routine I) is effected which sets the initial position of the headlamps, this being based on the values of the inclination angle pickup as soon as the vibration sensor indicates that the vehicle has come to rest.

Thereafter the universal control I runs and during the entire journey, proceeding from the initial beam range, adapts the beam range to the stopping distance (see FIG. 14), possibly in dependence upon the inclination angle via the auxiliary routine I. This universal routine runs during the entire journey with the following exceptions:

In the universal routine II (FIG. 14) the driver can "dip", i.e. arbitrarily reduce the beam range to the minimum value, the reduction taking place as slow as possible and the increase (corresponding to "switching to main beam") taking place as fast as possible. There is also the possibility of shortening the beam only to the extent that the beam range is reduced so that oncoming traffic is not disturbed by the light.

A further exception is the emergency control (universal routine III), that is the alternative of the emergency control I in which the beam range is set to the braking distance and the emergency control II in which the beam range is kept constant at the value of the braking distance before the braking, or the emergency control III in which the beam range is fixed to a line defined by the end of the stopping distance on the road just before the emergency braking.

In addition, when switching over the driving stages the auxiliary routine II illustrated above is used and sets the headlamps and foglamps in accordance with the stage selected.

Fundamentally, with the ALS according to the invention it is not essential for asymmetric light to be present. Also, with the aid of the illumination angle of the reflectors the light may be formed as desired in its width. This means that from each side it is possible to achieve a greater or smaller safety margin without any problem. In particular, according to the invention the beam width is adapted to the respective width of the road category (for example country road, 2-lane) so that the vehicle's own lane is always illuminated in optimum manner and oncoming traffic is not dazzled.

The fixed part of 30 m is also provided for all light constructions of the other ALS basic stages as "dry I". In these cases the fixed beam range of 30 m is exceeded even at a lower travelling speed than 50 km/h.

All the controls described here can be implemented in simple manner by the person skilled in the art, for example by means of a microprocessor system or the like with a central processing unit, memories, interfaces, etc.; since these components belong to the art they are not be described here.

The automatic light system according to the invention and shown again as a whole in FIG. 16 is a multifunctional system (programs and information) in which fixed programs with fixed data on the vehicle type, with adjustable data on the road condition and visibility ratios and instantaneous data on the speed form a system for controlling the beam range and the beam intensity of the vehicle. Adjustments are made at the start of the journey (auxiliary routine I), this being done on the basis of-the inclination angle (extra information I) and the external light (extra information II). During the journey the beam range and intensity are controlled by three universal routines and two auxiliary routines in dependence upon extra information and the universal information—speed. This multifunctional system (programs and information) forms the sole practical method of being able to control the beam range and intensity reliably during every instant of the journey.

It should be noted that the invention is not restricted to the embodiments illustrated here and modifications are possible. The scope of the invention is defined solely by the attached claims.

I claim:

1. Light system for controlling a beam range of a motor vehicle and comprising
   an automatic multifunctional system constructed from programs and information,
   the multifunctional system distinguishing between four basic stages for road conditions,
   the multifunctional system distinguishing in each of the four basic stages three stages of visibility conditions, thus giving twelve stages,
   in dependence upon a particular stage, on the basis of the programs and entered and current information, the multifunctional system controlling instantaneous beam range in such a manner that it always lies between a minimum and a maximum beam range, the formulae minimum beam range=minimum stopping distance maximum beam range=maximum stopping distance being fulfilled, in each basic stage the multifunctional system controlling light intensity in dependence upon the basic range in such a manner that an area in front of the vehicle is illuminated in optimum manner,
   so that all vehicles equipped with the automatic multifunctional system at any time during vehicle travel have a beam range and a light intensity which is adapted in optimum manner to the vehicle characteristics, the road conditions and the visibility conditions.

2. A light system for a motor vehicle having an actual minimum stopping distance and comprising
   headlamp means having a beam length adjustable between a minimum beam range and a maximum beam range,
   the headlamp means including for each vehicle side a main reflector and a fog reflector, the beam ranges of which are adjustable independently of each other,
   adjusting means for adjusting the beam range of the headlamp means, and
   control means for controlling the adjusting means automatically in such a manner that at any instant during vehicle travel the minimum beam range is not less than the actual minimum stopping distance of the vehicle.

3. The light system of claim 2 wherein with good visibility the main reflectors are operated in dependence upon the stopping distance and with average visibility the fog reflectors, the main reflectors remaining switched to an initial position, and with poor visibility both the main reflectors and the fog reflectors are operated in dependence upon the stopping distance.

4. A light system for a motor vehicle having an actual minimum stopping distance and an actual maximum stopping distance comprising
   headlamp means having a beam length adjustable between a minimum beam range and a maximum beam range,
   adjusting means for adjusting the bean range of the headlamp means, and
   control means for controlling the adjusting means automatically in such a manner that at any instance during vehicle travel the minimum beam range is not less than the actual minimum stopping distance of the vehicle,
   the control means determining a maximum beam range from the actual maximum stopping distance and reaction time of a driver and the beam range being continuously adjusted during vehicle travel so that it does not exceed the prospective maximum beam range.

5. The light system of claim 4 wherein when the vehicle is stationary or at low speeds the control means sets a fixed initial beam range which exceeds the stopping distance, the initial beam range being selected in particular at 30 m, and wherein the control means adjusts the minimum beam range when the stopping distance exceeds the initial beam range.

6. The light system of claim 4, including adjustment means directly coupled to a steering wheel for adjusting beam direction of the headlamp means in a horizontal plane.

7. Method for controlling beam range of a headlamp means of a motor vehicle during its travel and comprising the steps of
   automatically setting a minimum beam range for the headlamp means which does not drop below the value of a momentary stopping distance of the vehicle,
   automatically setting a maximum beam range for the headlamp means which does not exceed a momentary maximum stopping distance of the vehicle,
   calculating the minimum stopping distance from a sum of maximum braking distance and minimum reaction distance of a driver, and
   calculating the maximum stopping distance from a sum of maximum braking distance and maximum reaction distance of a driver.

8. Method of claim 7 further including a step of determining maximum braking distance for a maximum loaded vehicle in accordance with speed and road conditions as well as vehicle-specific data.

9. Method of claim 7 wherein the steps of calculating the minimum and maximum stopping distances are determined in accordance with minimum and maximum reaction times of an inexperienced or professional driver and speed, said reaction times of inexperienced and professional drivers being at all times absolutely the same ratio.

10. Method of claim 9 wherein the steps of calculating minimum and maximum stopping distances take into account driver reaction time dependent on weather and/or visibility conditions.

* * * * *